No. 711,801. Patented Oct. 21, 1902.
T. S. TILLEY.
MEASURING INSTRUMENT.
(Application filed Apr. 10, 1902.)
(No Model.) 2 Sheets—Sheet 1.
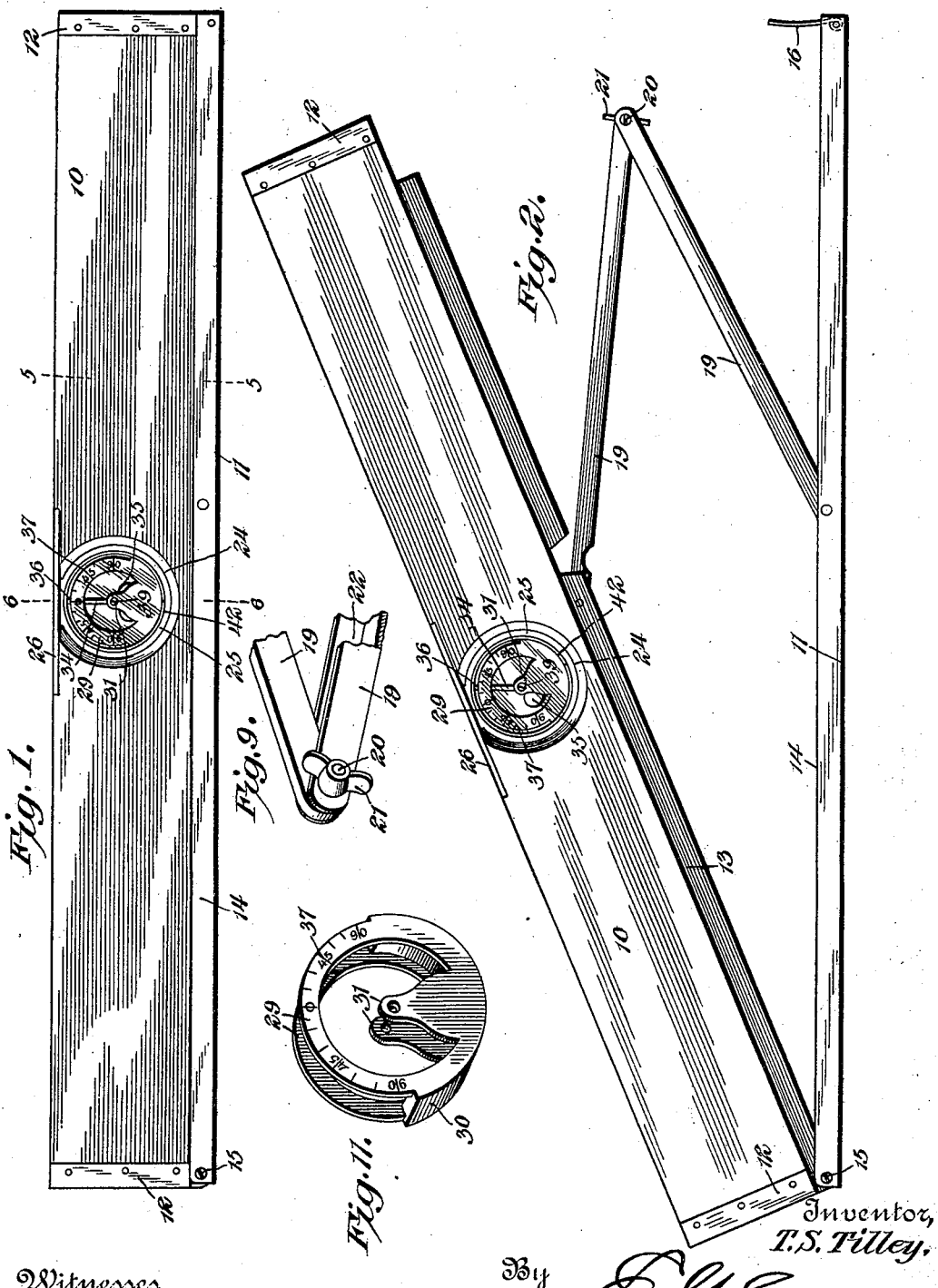
Witnesses
Howard T. Orr.
Inventor,
T. S. Tilley,
By
Attorney No. 711,801. Patented Oct. 21, 1902.
T. S. TILLEY.
MEASURING INSTRUMENT.
(Application filed Apr. 10, 1902.)
(No Model.) 2 Sheets—Sheet 2.
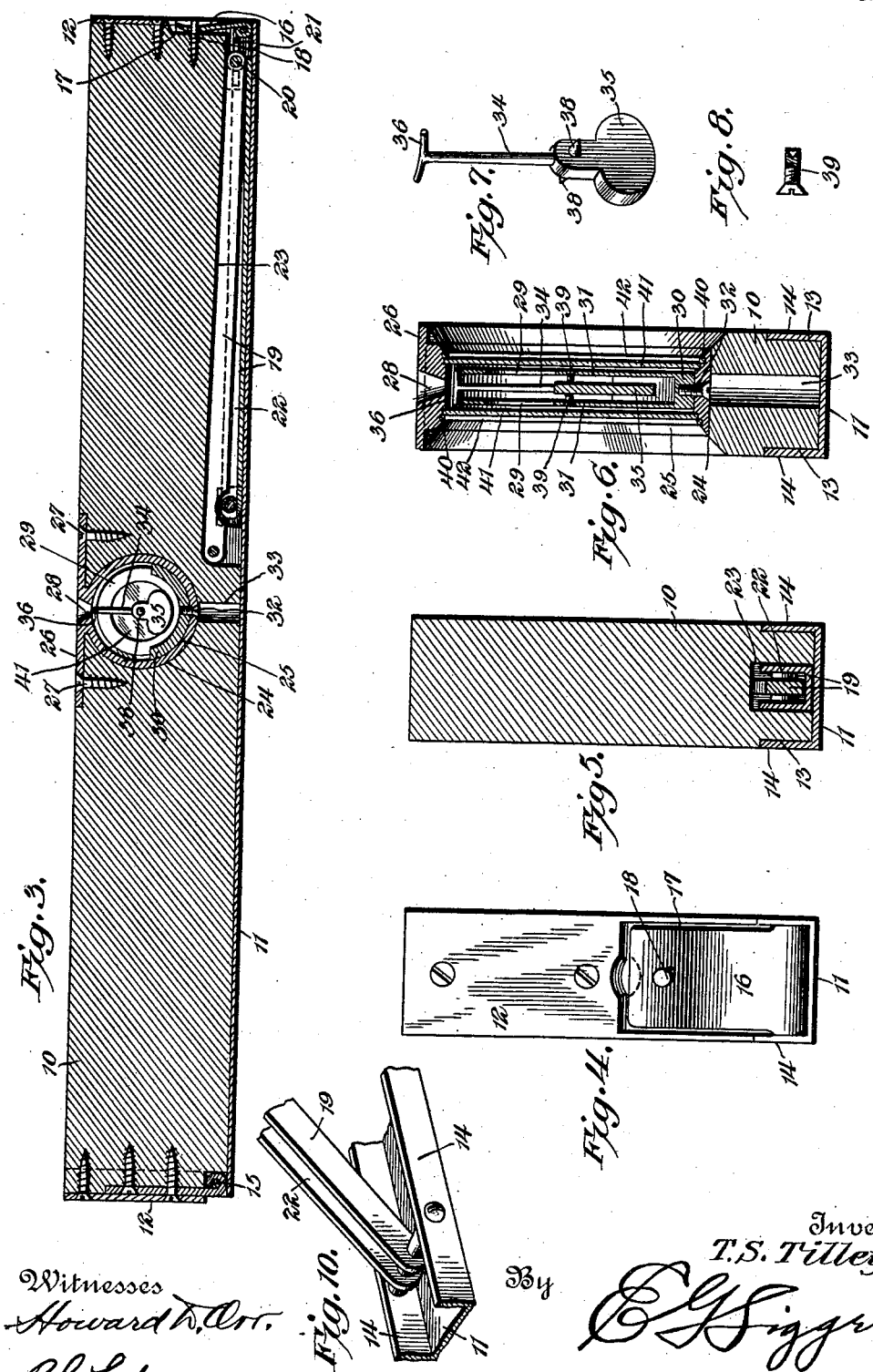
Witnesses
Howard L. Orr.
B. G. Foster.
Inventor,
T. S. Tilley,
By C. G. Siggers.
Attorney

UNITED STATES PATENT OFFICE.

THOMAS SEYMOUR TILLEY, OF NEWPORT, RHODE ISLAND, ASSIGNOR OF ONE-HALF TO WILLIAM J. THOMAS, OF NEWPORT, RHODE ISLAND.

MEASURING INSTRUMENT.

SPECIFICATION forming part of Letters Patent No. 711,801, dated October 21, 1902.

Application filed April 10, 1902. Serial No. 102,290. (No model.)

*To all whom it may concern:*

Be it known that I, THOMAS SEYMOUR TILLEY, a citizen of the United States, residing at Newport, in the county of Newport and State of Rhode Island, have invented a new and useful Measuring Instrument, of which the following is a specification.

The present invention relates to measuring instruments, and more particularly to combined plumb-levels and inclinometers.

The object of the invention is to provide a simple instrument of this character by means of which the angle of inclination of a surface or plane may be readily ascertained, said instrument being also capable of use as an ordinary level.

One of the features of the invention resides in the construction and combination of the elements whereby an easily-adjustable instrument is provided, which can be folded compactly to form a level of the usual shape, having no projecting portions that will interfere with its use, the several elements being completely housed within the same.

Another feature relates to the construction of the indicating mechanism, said mechanism being accurate and extremely sensitive in action, at the same time all of the parts being readily accessible and removable for the purpose of repair.

The preferred embodiment of the invention is illustrated in the accompanying drawings, wherein—

Figure 1 is a side elevation of the instrument when folded and ready for use as a level. Fig. 2 is a side elevation illustrating the members arranged in angular relation. Fig. 3 is a longitudinal sectional view through the instrument as shown in Fig. 1. Fig. 4 is an end elevation of the same. Fig. 5 is a cross-sectional view taken on the line 5 5 of Fig. 1. Fig. 6 is a cross-sectional view taken on the line 6 6 of Fig. 1. Fig. 7 is a detail perspective view of the pointer employed. Fig. 8 is a detail view of one of the journals for the same. Fig. 9 is a detail perspective view of the connection between the toggle-links. Fig. 10 is a similar view of the connection between the toggle-link and the base member. Fig. 11 is a detail perspective view of the supporting-frame for the pointer.

Similar numerals of reference designate corresponding parts in all the figures of the drawings.

In this embodiment of the invention a body member 10 and a base member 11 are employed, the body member being preferably a rectangular block of wood having the usual metallic end pieces 12 and having its lower side edges rabbeted, as shown at 13. The base member 11 is preferably of metal in the form of a channel-bar having upstanding side flanges 14. This base member is pivoted at one end to one end of the body member 10 by means of a suitable pivot-screw 15, and the flanges 14 are arranged to fit in the rabbets 13 of the body member when the two are folded together, as is clearly shown in Figs. 5 and 6. A latch 16, pivoted to the free end of the base member, is arranged to engage in a seat 17, formed in the free end of the body member and over a holding-pin 18, arranged in said seat.

Toggle-links 19 are pivoted to intermediate portions of the body and base members 10 and 11, said links being pivotally connected by means of a holding-screw 20, having a thumb-nut 21. One of these links is provided with a longitudinal channel 22, within which the other link is arranged to fit when said links are folded together, and the body member is provided with a longitudinal groove 23, that receives both the links when the two members are in folded position, said links in this position being completely housed within the body member and covered by the base member, as is clearly shown in Fig. 5.

The body 10 is provided, preferably in its central portion, with a transverse circular socket 24, within which is secured a casing 25, having an upper face-plate 26, through which are passed fastening-screws 27, said plate being provided with a sight-opening 28. Within this casing is fitted a frame comprising spaced indicator-rings 29, that are connected at their lower portions by means of a web 30, said frame having spaced journal-posts 31, that extend within the rings, as shown. The frame is secured in place by a screw 32, passing through the lower portion of the casing 25 and engaging the web 30, this screw being accessible through an opening 33, that extends to the same from the lower side of the body. An indicator is pivotally mounted between the ring, the indicator comprising a stem 34, having at its lower end a weight 35 and at its upper end a cross-finger 36, that extends over the rings and coacts with indicator-scales, as 37, marked upon the upper portions of the rings 29, being preferably divided into degrees of a circle, zero being the uppermost and directly in line with the sight-opening 28. The pointer is provided with cone-bearings 38, that are journaled in screws 39, passed through the openings in the posts 31, said screws being concentric to the peripheries of the rings 29. This affords an extremely-sensitive bearing, which permits the free movement of the pointer. The casing 25 has its opposite sides open, and in the inner edges are located grooves 40. Covers 41, preferably of glass, are fitted in the open sides of the casing and are held against displacement by means of expansible split rings 42, which are fitted in the grooves 40 and engage the outer edges of the glass covers 41.

The manner of using the instrument will be obvious to those skilled in this art. When it is to be employed as an ordinary level, the base and body members are folded together and locked, so that the toggle-links and other mechanism are completely housed, and a level is provided of the ordinary shape, having no projecting portions to interfere with its use. The pointer will indicate upon the scales any variation from a horizontal position, and in case a side view cannot be had of the instrument the position of the pointer may be seen through the upper sight-opening 28. When it is desired to obtain an angle of inclination, it is only necessary to unlatch the base and body members and raise the latter as shown in Fig. 2, these members being locked at any desired angle by means of the screw 20 and thumb-nut 21. In case it should become desirable from any cause to remove any parts of the indicating mechanism it is only necessary to release one of the glass sides by removing the spring-ring holding the same, unscrew the supporting-frame, whereupon it may be readily taken out through the open side. It will thus be seen that a very simple instrument is provided, which accomplishes all the objects mentioned in the preliminary portion of the specification, said instrument being simple, compact, and easily operable.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In an instrument of the class described, the combination with a pair of pivotally-connected members, one of said members being in the form of an open-sided casing, of a clinometer carried by one of the members, means for holding them in angular relation, said means being movable into and out of the casing, the other member having one edge that fits within the casing and covers the holding means.

2. In an instrument of the class described, the combination with a base member having upstanding flanges, of a body member pivoted to the base member and arranged to fit between the flanges of the base member, and toggle-links connecting the base and body members and foldable between the flanges of the base member.

3. In an instrument of the class described, the combination with a base member having upstanding flanges, of a body member pivoted to the base member and arranged to fit between the flanges thereof, said body member having a longitudinally-disposed seat, and toggle-links connecting the base and body members, said links being foldable between the flanges of the base member and fitting in the seat of the body member.

4. In an instrument of the class described, the combination with a base member, of a body member pivoted at one end to one end of the base member, means connecting the base and body members to hold them in angular relation, said means being housed between the members when said members are folded, and a fastening device carried by the free end of one member and detachably engaging the free end of the other member to fasten said members together.

5. In an instrument of the class described, the combination with a base member having upstanding flanges, of a body member pivoted to the base member and arranged to fit between the flanges thereof, and toggle-links connecting the base and body members and foldable between the same, one of said links having a longitudinal channel in which the other is arranged to be seated when the links are folded.

6. In an instrument of the class described, the combination with a body having a socket, of a casing secured within the socket, a frame arranged within the casing and secured thereto, said frame comprising spaced indicator-rings having scales thereon, journal-posts secured to the rings and projecting within the same, and a weighted pointer pivoted to and between the posts and having a cross-finger extending across the rings and coacting with the scales thereon.

7. In an instrument of the class described, the combination with a body provided with a socket having a portion that opens at one edge of said body, of a casing fitted in the socket and having a portion extended to the edge of the body, said portion having a sight-opening, a frame detachably secured within the casing, said frame comprising spaced indicator-rings connected at their lower portions and having scales on their upper portions, spaced posts secured to the rings, and a pointer pivoted to and between the posts, said pointer having a weight at one end and a cross-finger at its opposite end that coacts with the scales of the rings and is movable across the sight-opening of the casing.

8. In an instrument of the class described, the combination with a body having a socket, of a frame fitted within the socket and comprising spaced indicator-rings connected at their lower portions and having scales on the upper portions of their outer faces, spaced posts secured to the lower portions of the rings and located within the same, and a pointer pivoted to and between the posts, said pointer having a weight at one end and a cross-finger at its opposite end that extends across the outer edges of the rings and coacts with the scales thereof.

9. In an instrument of the class described, the combination with pivotally-connected members, of a clinometer mounted upon one of the members, toggle-links pivotally connected to the members, and folding one within the other between the two members, and a holding device for the links arranged to clamp them against relative movement.

10. In an instrument of the class described, the combination with a base member having side flanges, of a body member pivoted to the base member and arranged to fit between the flanges thereof, and toggle-links connecting the base and body members, said links being foldable between the flanges of the base member.

In testimony that I claim the foregoing as my own I have hereto affixed my signature in the presence of two witnesses.

THOMAS SEYMOUR TILLEY.

Witnesses:
 BENJ. C. WEAVER,
 LOUIS M. JONES.